United States Patent [19]

Harada et al.

[11] 4,168,358
[45] Sep. 18, 1979

[54] METHOD FOR PRODUCING OLEFIN POLYMERS

[75] Inventors: Hiroyuki Harada; Yuji Kobayashi; Keisaku Yamamoto, all of Ichihara, Japan

[73] Assignee: Sumitomo Chemical Company Limited, Osaka, Japan

[21] Appl. No.: 810,169

[22] Filed: Jun. 27, 1977

[30] Foreign Application Priority Data

Jul. 5, 1976 [JP] Japan .................................. 51-80070
Oct. 1, 1976 [JP] Japan .................................. 51-118757

[51] Int. Cl.$^2$ ......................... C08F 4/68; C08F 10/02
[52] U.S. Cl. ............................... 526/143; 252/429 B; 252/431 R; 526/137; 526/282; 526/283; 526/348; 526/348.6; 526/352
[58] Field of Search ................. 252/429 B, 431 R; 526/137, 143, 144

[56] References Cited

U.S. PATENT DOCUMENTS

| | | | |
|---|---|---|---|
| 3,161,628 | 12/1964 | Dort et al. | 526/137 |
| 3,301,834 | 1/1967 | Christman | 526/143 |
| 3,534,006 | 10/1970 | Kamaishi et al. | 526/137 |

FOREIGN PATENT DOCUMENTS

| | | | |
|---|---|---|---|
| 917439 | 2/1963 | United Kingdom | 526/144 |
| 181292 | 9/1966 | U.S.S.R. | 526/144 |

OTHER PUBLICATIONS

Brewster, Organic Chemistry, Prentice-Hall, Inc., N.Y. (1948), p. 117.

*Primary Examiner*—Edward J. Smith
*Attorney, Agent, or Firm*—Stevens, Davis, Miller & Mosher

[57] ABSTRACT

In a method for producing olefin polymers which comprises polymerizing ethylene monomer alone, or two components comprising ethylene and α-olefins of the formula, $CH_2=CHR$ (in which R is a straight or branched alkyl group having 1 to 6 carbon atoms), or three components comprising ethylene, said α-olefin and one or more of straight or cyclic diene or polyene monomers having a non-conjugated double bond, in the presence of a catalyst, the improvement which comprises using a catalyst system comprising (1) an organoaluminum compoum, (2) a 3- to 5-valent vanadium compound soluble in organic inert solvents, and (3) (A) a compound of the formula,

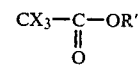

(in which R' is a group having a straight or cyclic ether linkage, and X is a halogen atom), or (B) a reaction product of phosphorus pentachloride with an alcohol as an activating agent.

25 Claims, No Drawings

METHOD FOR PRODUCING OLEFIN POLYMERS

The present invention relates to polymerization of ethylene or copolymerization of ethylene and α-olefins of the formula, $CH_2=CHR$.

Various kinds of catalyst have so far been proposed to produce amorphous olefin copolymers, and the so-called Ziegler catalysts among them are particularly useful. Among Ziegler catalysts, those comprising an organo-aluminum compound and a vanadium compound particularly a 3- to 5-valent vanadium compound soluble in organic inert solvents are known to be extremely effective. Many of such vanadium-containing catalyst systems have extremely high activity at the initial stage of the polymerization, but the activity drops rapidly in a relatively short time so that the catalytic efficiency is low. Various kinds of activating agent have been proposed to improve the low catalytic efficiency of these catalysts. For example, there are known halogenated hydrocarbons, organic azo compounds, quinones, sulfonyl chloride and the like. Alkyl esters of trichloroacetic acid and tribromoacetic acid are also well-known (Japanese Patent Publication No. 13,052/1968). Further, as the phosphorus chloride type activating agents, halogenides of trivalent phosphorus such as phosphorus trichloride, dichloroarylphosphine and the like are well-known (Japanese Patent Publication Nos. 13,141/1968 and 15,510/1971). These compounds are all useful for increasing the catalytic activity in the copolymerization of ethylene and α-olefins, but they cause gelation and a large decrease in activity during the polymerization of three components including a polyene. Other activating agents which have so far been proposed also act to form gel during the polymerization of three components including a diene or polyene.

The method of the present invention is characterized in that the polymerization is carried out with a novel catalyst comprising a novel activating agent as a third component and the well-known catalysts comprising an organo-aluminum compound and a 3- to 5-valent vanadium compound soluble in organic inert solvents, said agent being (A) a halogenated compound of the formula,

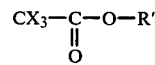

(in which X is a halogen atom and R' is a group having a straight or cyclic ether linkage) (referred to as activating agent (A) hereinafter) or being (B) a reaction product of phosphorus pentachloride and an alcohol (referred to as activating agent (B) hereinafter).

An object of the present invention is to improve the catalytic activity to a large extent with a novel activating agent, thereby attaining a large decrease in the amount of vanadium compound per unit weight of polymer.

Another object of the present invention is to provide an effective method for polymerizing ethylene monomer alone, or two components comprising ethylene and α-olefins of the formula, $CH_2=CHR$ (in which R is a straight or branched alkyl group having 1 to 6 carbon atoms), or three or more components comprising ethylene, said α-olefin and one or more of straight or cyclic diene or polyene monomers having a non-conjugated double bond.

According to the present invention, the catalytic efficiency can be elevated by the novel activating agents to an extremely high level that can not be attained with the alkyl esters of trichloroacetic acid or tribromoacetic acid. Furthermore, a decrease in the catalytic activity is not noticeable even in the three-component polymerization of ethylene, α-olefin and diene. Still furthermore, the formation of gel during the polymerization is not noticeable at all.

The organo-aluminum compounds used in the present invention have the formula,

wherein R" is a hydrocarbon group having 1 to 20 carbon atoms, X is a halogen atom or an alkoxy group and a is a number satisfying $1 \leq a \leq 3$.

Among the compounds, trialkylaluminum, dialkylaluminum monohalide, dialkylaluminum monoalkoxide, alkylaluminum sesquihalide and alkylaluminum dihalide are effective and they are used alone or in mixtures. The specific examples of these compounds are as follows: Triethylaluminum, triisopropylaluminum, triisobutylaluminum, trihexylaluminum, diethylaluminum chloride, diethylaluminum bromide, diethylaluminum ethoxide, diisobutylaluminum chloride, diisobutylaluminum bromide, diisobutylaluminum butoxide, ethylaluminum sesquichloride, isobutylaluminum sesquichloride, ethylaluminum dichloride, ethylaluminum dibromide, isobutylaluminum dichloride, isobutylaluminum dibromide and the like.

As the vanadium compounds used in the present invention, 3- to 5-valent vanadium compounds soluble in organic inert solvents are used. Among the compounds, vanadium halides, vanadium oxyhalides, complexes with oxygen-containing compounds, vanadyl esters are preferred. The organic inert solvents referred to herein mean those commonly used for this form of polymerization. The specific example of the solvents will be shown hereinafter.

The specific examples of the vanadium compounds are as follows: Vanadium tetrachloride, vanadium oxytrichloride, vanadium trisacetylacetonate, vanadyl triethoxide, vanadyl ethoxymonochloride, vanadyl ethoxydichloride, vanadyl tributoxide, vanadyl butoxymonochloride, vanadyl butoxydichloride and the like.

The activating agent (A) used in the present invention is represented by the formula,

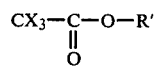

wherein X is a halogen atom and preferably a chlorine or bromine atom, and R' is a group having a straight or cyclic ether linkage. When R' is a group having a straight ether linkage, R' is further represented by the formula,

wherein $R_1$ is a alkylene oxide or polyalkylene oxide group of the formula, $+CHY-CH_2-O+_n$ or $+(CH_2+_m O+_k$ (in which Y is a hydrogen atom or an alkyl group, n is an integer of 1 to 5, m is an integer of 1 to 10 and k is an integer of 1 to 5), and $R_2$ is a straight or branched alkyl group having 1 to 6 carbon atoms, a phenyl group or benzyl group. When R' is a group having a cyclic ether linkage, it includes a 2,3-epoxy-1-propyl, furfuryl or tetrahydrofurfuryl group.

The specific examples of the activating agent (A) are as follows: Esters of trichloroacetic acid or tribromoacetic acid with methyl cellosolve, ethyl cellosolve, propyl cellosolve, isopropyl cellosolve, butyl cellosolve, phenyl cellosolve, benzyl cellosolve, methylcarbitol, ethylcarbitol, propylcarbitol, butylcarbitol, propylene glycol monoethyl ether, propylene glycol monobutyl ether, propylene glycol monomethyl ether, 1-butoxy-2-propanol, 2,3-ethoxy-1-propanol, furfuryl alcohol, tetrahydrofurfuryl alcohol and the like. Further, the esters of the both acids with polyethylene glycol monoalkyl ether or polypropylene glycol monoalkyl ether can also be used.

As the activating agent (B), phosphorus pentachloride may be used alone. But, it is insoluble in the usual hydrocarbon solvents so that it is difficult to add to a polymerization vessel, and inferior in uniform distribution in the vessel. Reaction products resulting from phosphorus pentachloride and an alcohol are soluble in the usual hydrocarbon solvents. Consequently, they are very easy to add to the vessel and moreover they are useful for a further improvement in the catalytic activity.

The activating agent (B) is produced by the reaction of phosphorus pentachloride and an alcohol. This reaction is very easily carried out, for example by adding dropwise the alcohol, with stirring, to the usual hydrocarbon solvent or halogenated hydrocarbon solvent (e.g. hexane, heptane, kerosene, cyclohexane, benzene, chloroform, trichloroethylene) containing phosphorus pentachloride. The alcohol may be added alone or in mixtures with a diluent to phosphorus pentachloride. The diluent may be any of the foregoing hydrocarbon solvents, but preferably it is the same hydrocarbon solvent that is used for mixing with phosphorus pentachloride.

On stirring the reaction system for 10 to 60 minutes after addition of the alcohol is finished, the system becomes a homogeneous solution. This solution may be used as it is as an activating agent. Alternatively, the reaction product itself may be used as an activating agent and the product can be separated as a crystal by removing the solvent from the solution, for example by distillation. This reaction may be carried out at any temperature between 0° C. and the boiling point of the solvent. But, the reaction can be allowed to proceed sufficiently at room temperature without cooling or heating. This reaction is carried out in an atmosphere of inert gas (for example in an argon atmosphere using Schlenk's tube). In this reaction, the molar ratio of phosphorus pentachloride to alcohol is preferably 1:1 to 1:3.

As the alcohols used for reaction with phosphorus pentachloride, alkyl and cycloalkyl alcohols, preferably those having 1 to 10 carbon atoms, allyl alcohol, benzyl alcohol and alcohols having an ether linkage (e.g. cellosolves, preferably those having 3 to 9 carbon atoms and carbitols, preferably those having 5 to 9 carbon atoms) are used.

The specific examples of the alcohols are as follows: Methanol, ethanol, n-propanol, iso-propanol, n-butanol, tert-butanol, n-octanol, allyl alcohol, cyclohexanol, benzyl alcohol, methyl cellosolve, ethyl cellosolve, propyl cellosolve, butyl cellosolve, phenyl cellosolve, benzyl cellosolve, methylcarbitol, ethylcarbitol, propylcarbitol, butylcarbitol, propylene glycol monoethyl ether, propylene glycol monobutyl ether, 2,3-epoxy-1-propanol, furfuryl alcohol and tetrahydrofurfuryl alcohol.

The α-olefins used in combination with ethylene in this invention are represented by the formula, $CH_2=CHR$ (in which R is a straight or branched alkyl group having 1 to 6 carbon atoms). Specifically, they are propylene, 1-butene, 1-pentene, 1-hexene and 4-methylpentene, among which propylene is particularly preferred.

As the non-conjugated diene or polyene components used in the three-component polymerization with the catalyst system of this invention, there are exemplified 1,4-hexadiene, 1,6-octadiene, 6-methyl-1,5-heptadiene, 1,9-octadecadiene, cyclopentadiene-1,4, cycloheptadiene-1,4, dicyclopentadiene, 5-methylene-2-norbornene, 5-isopropenyl-2-norbornene, 2-methyl-2,5-norbornadiene, 5-ethylidene-2-norbornene, cyclooctadiene-1,5, methyltetrahydroindene and the like. Among them, 1,4-hexadiene, dicyclopentadiene, 5-ethylidene-2-norbornene are particularly preferred.

The polymerization with the catalyst system of this invention is carried out in the usual organic inert solvent such as hydrocarbons or halogenated hydrocarbons. For example, it is carried out according to the form of solution polymerization using a solvent (e.g. hexane, heptane, kerosene, cyclohexane, benzene, chloroform, trichloroethylene, tetrachloroethane, and perchloroethylene) which is capable of dissolving the copolymers. The polymerization may also be carried out according to the form of suspension polymerization using a solvent (e.g. 1,2-dichloroethane, and methylene chloride) which is incapable of dissolving the copolymers.

In the present invention, the activating agent may be added in any way, for example it may be added alone or in mixtures with the catalyst prior to the polymerization, or it may be added in one lot at the beginning of the polymerization, or continuously or in portions in the course of the polymerization.

The polymerization temperature may be varied in a wide range, but the range is generally −50° to 100° C., preferably −30° to 80° C. The polymerization may be carried out at atmospheric pressure or higher, but the pressure range is preferably 1 to 50 kg/cm², particularly preferably 1 to 30 kg/cm².

In practicing the method of this invention, the amount of activating agent may be varied in a wide range, but the mole number of the agent should not exceed that of the organo-aluminum compound. The molar ratio of organo-aluminum compound to activating agent is preferably 1:0.005 to 1:0.8, more preferably 1:0.01 to 1:0.5. The range of the molar ratio of organo-aluminum compound to vanadium compound may be as wide as 1000:1 to 3:1, but it is preferably 5:1 to 100:1. The molar ratio of activating agent to vanadium compound can optionally be varied within the ranges satisfying both foregoing molar ratios.

The composition of the copolymers of ethylene and α-olefin can be varied in a wide range by producing the copolymers using the catalyst system of this invention. In the copolymerization of ethylene and α-olefins in the usual solvent capable of dissolving the copolymer produced, when the ethylene content of the copolymer exceeds 75%, the copolymer is no longer soluble in the solvent, giving an nonhomogeneous polymer solution. But, by employing the catalyst system of this invention, it becomes possible to obtain a homogeneous polymer solution, even though the ethylene content of the copolymer is within the range above 75%. That is, even the ethylene/α-olefin copolymers having an ethylene content as high as 90 mole % can easily be produced according to the solution polymerization.

In producing copolymers of ethylene and α-olefin or multi-component polymers of ethylene, α-olefin and polyene compound according to the present invention, the molecular weight adjusting agents commonly used may be added to regulate the molecular weight of these polymers. As the agent, diethyl zinc, allyl chloride, pyridine-N-oxide, hydrogen and the like are commonly used. Among them, hydrogen is particularly preferred. The activating agent of this invention has also an action to control the molecular weight, and therefore a small amount of a molecular weight adjusting agent is sufficient. The required amount of the adjusting agent can easily be determined by the skilled in the art depending upon the purposes.

The present invention will be illustrated specifically with reference to the following examples and reference examples, but the present invention is not limited to these examples.

COMPARATIVE EXAMPLE 1

Polymerization was carried out with no activating agent.

A 2-liter separable flask was equipped with a stirrer, thermometer, dropping funnel and reflux condenser, and then the pressure in the flask was reduced and the atmosphere was replaced with nitrogen. One liter of dry n-hexane was charged in the flask and saturated with ethylene and propylene by passing a mixed gas of ethylene (40 mole %) and propylene (60 mole %) therethrough at a rate of 10 Nl/min at a constant temperature of 30° C. Thereafter, 4 mmole of ethylaluminum sesquichloride and then 0.2 mmole of vanadium oxytrichloride were added to start the polymerization. The polymerization was continued while passing the mixed gas of ethylene and propylene for 30 minutes with stirring. Next, the reaction was stopped by adding 30 ml of methanol and the reaction mixture was sufficiently washed with methanol and poured into a large amount of methanol to deposite the copolymer. The deposited product was dried to obtain 13.8 g of a white amorphous solid copolymer. The intrinsic viscosity of polymer was 2.12 dl/g (70° C., in xylene) and the propylene content measured by the infrared absorption spectrum was 41.8%.

EXAMPLE A-1

The procedure was carried out in the same manner as in Comparative Example 1 using the same equipment except that an ester resulting from trichloroacetic acid and ethyl cellosolve was used as an activating agent and that 0.8 mmole of the ester was added together with 0.2 mmole of vanadium oxytrichloride. Thus, 64.1 g of a white amorphous solid copolymer was obtained. This yield corresponds to a catalytic efficiency of 4.65 times as large as that of the case with no activating agent. This polymer had an intrinsic viscosity of 1.96 dl/g and a propylene content of 39.4%.

COMPARATIVE EXAMPLE 2

In this example, the alkyl ester of trichloacetic acid was used. The procedure was carried out in the same manner as in Example A-1 except that 0.8 mmole of methyl trichloroacetate was used in place of said ester resulting from trichloroacetic acid and ethylene glycol monoethyl ether (ethyl cellosolve). In this case, 39.2 g of a white amorphous solid copolymer was only obtained. This polymer had an intrinsic viscosity of 1.99 dl/g and a propylene content of 36.2%.

EXAMPLE A-2

The procedure was carried out in the same manner as in Example A-1 except that 8 mmole of ethylidene norbornene was previously added to the polymerization flask. Thus, 60.4 g of a white amorphous solid terpolymer was obtained. This polymer had an intrinsic viscosity of 1.89 dl/g, a propylene content of 37.9% and an iodine value of 1.9.

EXAMPLE A-3

The procedure was carried out in the same manner as in Example A-2 except that dicyclopentadiene was used in place of ethylidene norbornene. Thus, 61.2 g of a white amorphous solid terpolymer was obtained. This polymer had an intrinsic viscosity of 1.93 dl/g, a propylene content of 38.6% and an iodine value of 2.1.

EXAMPLES A-4 TO A-13

The procedures were carried out in the same manner as in Example A-1 except that the kinds of activating agent, organo-aluminum compound and vanadium compound were varied as shown in Table 1. The results are shown in Table 1.

Table 1

| Example | Organo-aluminum compound | Vanadium compound | Activating agent | Yield (g) |
|---|---|---|---|---|
| A-4 | EtAlCl$_2$ | VOCl$_3$ | ethyl cellosolve ester of trichloroacetic acid | 42.1 |
| A-5 | Et$_2$AlCl | VO(OEt)$_3$ | the same as above | 41.7 |
| A-6 | the same as above | VO(OEt)Cl$_2$ | the same as above | 40.6 |
| A-7 | Et$_{1.5}$AlCl$_{1.5}$ | VOCl$_3$ | methyl cellosolve ester of trichloroacetic acid | 60.8 |
| A-8 | the same as above | the same as above | butyl cellosolve ester of trichloroacetic acid | 63.3 |
| A-9 | Et$_2$AlCl | V(Acac)$_3$ | ethyl cellosolve ester of trichloroacetic acid | 59.7 |
| A-10 | Et$_{1.5}$AlCl$_{1.5}$ | VOCl$_3$ | ethyl cellosolve ester of tribromoacetic acid | 62.4 |
| A-11 | the same as above | the same as above | phenyl cellosolve ester of trichloroacetic acid | 55.0 |
| A-12 | the same as above | the same as above | carbitol ester of trichloroacetic acid | 37.8 |

Table 1-continued

| Example | Organo-aluminum compound | Vanadium compound | Activating agent | Yield (g) |
|---|---|---|---|---|
| A-13 | the same as above | the same as above | butylcarbitol ester of trichloroacetic acid | 47.6 |

Note:
Et ethyl group
OEt ethoxy group
V(Acac)$_3$ *vanadium trisacetylacetonate*

EXAMPLE A-14

The procedure was carried out in the same manner as in Example A-1 except that n-hexane and propylene were replaced with perchloroethylene and butene-1, respectively, and that hydrogen was passed at a rate of 2 Nl/min as a molecular weight adjusting agent. Thus, 51.4 g of a white amorphous solid copolymer was obtained. This polymer had an intrinsic viscosity of 1.68 dl/g, and a butene-1 content of 37.6%.

COMPARATIVE EXAMPLE 3

Polymerization of ethylene was carried out with no activating agent.

The procedure was carried out in the same manner as in Comparative Example 1 except that ethylene was passed at a rate of 8 Nl/min in place of the mixed gas of ethylene and propylene. Thus, a white powdery polyethylene was obtained but its yield was only 25 g.

EXAMPLE A-15

The procedure was carried out in the same manner as in Comparative Example 3 except that an ester resulting from trichloroacetic acid and methyl cellosolve was used as an activating agent and that 0.8 mmole of the ester was added together with the vanadium compound. Thus, 118 g of a white powdery polyethylene was obtained.

EXAMPLE A-16

The procedure was carried out in the same manner as in Example A-2 except that an ester resulting from trichloroacetic acid and isopropyl cellosolve was used as an activating agent and that 30 mmole of ethylidene norbornene was previously added to the polymerization flask. Thus, 43.2 g of a white amorphous solid terpolymer was obtained. This polymer had an intrinsic viscosity of 2.60 dl/g, a propylene content of 31.7% and an iodine value of 9.4.

EXAMPLE A-17

The procedure was carried out in the same manner as in Example A-16 except that an ester resulting from trichloroacetic acid and 1-butoxy-2-propanol was used as an activating agent. Thus, 43.7 g of a white amorphous solid terpolymer was obtained. This polymer had an intrinsic viscosity of 1.84 dl/g, a propylene content of 32.9% and an iodine value of 8.1.

EXAMPLE B-1

(a) Preparation of activating agent

The atmosphere of Schlenk's tube was replaced with argon and 10.4 g of phosphorus pentachloride and 100 ml of n-hexane were charged therein. Thereafter, 1.5 g of methanol was dropwise added gradually at room temperature while stirring the mixture of phosphorus pentachloride and hexane. After addition of methanol was finished, stirring of the reaction mixture was continued for a further 40 minutes to obtain a homogeneous solution of activating agent in hexane. This reaction was carried out in the atmosphere of inert gas throughout the whole period.

(b) Polymerization

The procedure was carried out in the same manner as in Example A-1 using 0.5 mmole of the activating agent prepared in (a). Thus, 22.8 g of a white amorphous solid copolymer was obtained. This polymer had an intrinsic viscosity of 2.02 dl/g and a propylene content of 41.0%.

EXAMPLE B-2

The procedure was carried out in the same manner as in Example B-1 except that 5 mmole of ethylidene norbornene was previously added to the polymerization flask. Thus, 23.0 g of a terpolymer was obtained. This terpolymer had an intrinsic viscosity of 2.13 dl/g (70° C., in xylene), a propylene content of 38.7% and an iodine value of 1.8.

It is usual that diene monomers such as ethylidene norbornene act to inhibit polymerization, but such action was hardly observed with the catalyst system of this invention.

EXAMPLE B-3

The procedure was carried out in the same manner as in Example B-2 except that 5 mmole of dicyclopentadiene was used in place of ethylidene norbornene. Thus, 21.1 g of a white amorphous solid terpolymer was obtained. This polymer had an intrinsic viscosity of 2.19 dl/g (70° C., in xylene), a propylene content of 35.6 mole % and an iodine value of 3.1.

COMPARATIVE EXAMPLE 4

The procedure was carried out in the same manner as in Example B-3 except that an activating agent was not added. In this case, only 7.1 g of a white amorphous solid terpolymer was obtained. This polymer had an intrinsic viscosity of 1.58 dl/g (70° C., in xylene), a propylene content of 31.4% and an iodine value of 11.4.

EXAMPLES B-4 TO B-9

In (a) of Example B-1, iso-propanol, n-butanol, tert-butanol, n-octanol, allyl alcohol and cyclohexanol were used in place of methanol and each of them was reacted with phosphorus pentachloride in a molar ratio of 1:1. Using the hexane solutions thus obtained as an activating agent, polymerization was carried out in the same manner as in Example B-1. The results are shown in Table 2.

Table 2

| Example | Alcohol | Yield of polymer (g) | Propylene content (mole %) | Intrinsic viscosity (dl/g) |
|---|---|---|---|---|
| B-4 | iso-PrOH | 17.9 | 37.8 | 2.26 |
| B-5 | n-BuOH | 22.5 | 37.7 | 1.99 |
| B-6 | t-BuOH | 19.4 | 38.7 | 2.81 |
| B-7 | n-OctOH | 21.7 | 38.3 | 2.31 |
| B-8 | Allyl alcohol | 17.4 | 36.4 | 2.23 |

Table 2-continued

| Example | Alcohol | Yield of polymer (g) | Propylene content (mole %) | Intrinsic viscosity (dl/g) |
|---|---|---|---|---|
| B-9 | 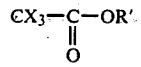 | 20.3 | 37.9 | 2.09 |

EXAMPLES B-10 AND B-11

The preparation of activating agent was carried out in the same manner as in (a) of Example B-1 except that the molar ratios of phosphorus pentachloride to methanol were 1:2 and 1:3, respectively.

Using the activating agents thus obtained, polymerization was carried out in the same manner as in Example B-1. The results are shown in Table 3.

EXAMPLE B-12

Using the same activating agent as in Example B-1, the procedure was carried out in the same manner as in Example A-1 except that triethoxy vanadate was used as a vanadium compound and that perchloroethylene and butene-1 were used in place of dry n-hexane and propylene, respectively. The results are shown in Table 3.

EXAMPLE B-13

The procedure was carried out in the same manner as in Example B-1 except that a dry kerosene was used as a solvent and that vanadium trisacetylacetonate and diethylaluminum chloride were used as a vanadium compound and an organo-aluminum compound, respectively. The results are shown in Table 5.

EXAMPLES B-14 AND B-15

The activating agent was prepared in the same manner as in Example B-1 except that ethyl cellosolve and ethyl carbitol were used in place of methanol. Polymerization was carried out in the same manner as in Example B-1 except that perchloroethylene was used in place of n-hexane. The results are shown in Table 3.

Table 3

| Example | Yield of polymer (g) | Propylene content (mole %) | Intrinsic viscosity (dl/g) |
|---|---|---|---|
| B-10 | 20.56 | 36.0 | 2.92 |
| B-11 | 16.28 | 35.0 | 2.78 |
| B-12 | 21.7 | 31.6 (butene-1 content) | 2.13 |
| B-13 | 22.4 | 38.7 | 1.73 |
| B-14 | 24.1 | 35.9 | 2.21 |
| B-15 | 22.6 | 36.3 | 2.33 |

What is claimed is:

1. In a method for producing olefin polymers which comprises polymerizing ethylene monomer alone, or two components comprising ethylene and α-olefins of the formula, CH$_2$=CHR (in which R is a straight or branched alkyl group having 1 to 6 carbon atoms), or three components comprising ethylene, said α-olefin and one or more of straight or cyclic diene or polyene monomers having a non-conjugated double bond, in the presence of a catalyst, the improvement which comprises using a catalyst system comprising (1) an organoaluminum compound, (2) a 3- to 5-valent vanadium compound soluble in organic inert solvents, and (3) (A) a compound of the formula,

(in which R' is a group having a straight or cyclic ether linkage, and X is a halogen atom), wherein when R' is a group having a straight ether linkage, it is represented by the formula —R$_1$—R$_2$, in which R$_1$ is an alkylene oxide or polyalkylene oxide group and R$_2$ is a straight or branched alkyl group having 1 to 6 carbon atoms, a phenyl or benzyl group as an activating agent.

2. A method according to claim 1, wherein the organo-aluminum compound is one represented by the formula, $$R''_n AlX_{3-n}$$

wherein R'' is a hydrocarbon group having 1 to 20 carbon atoms, X is a halogen atom and n is a number satisfying $1 \leq n \leq 3$.

3. A method according to claim 2, wherein the organo-aluminum compound is a member selected from the group consisting of diethylaluminum chloride, ethylaluminum dichloride, diisobutylaluminum chloride, isobutylaluminum dichloride, ethylaluminum sesquichloride and isobutylaluminum sesquichloride.

4. A method according to claim 1, wherein the vanadium compound is a member selected from the group consisting of vanadium halides, vanadium oxyhalides, complexes with oxygen-containing compounds and vanadyl esters.

5. A method according to claim 4, wherein the vanadium compound is a member selected from the group consisting of vanadium tetrachloride, vanadium oxytrichloride, vanadium trisacetylacetonate, vanadyl triethoxide, vanadyl ethoxymonochloride, vanadyl ethoxydichloride, vanadyl tributoxide, vanadyl butoxychloride and vanadyl butoxydichloride.

6. A method according to claim 1, wherein the group X in the formula,

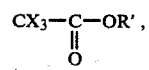

representing said compound (A) is a chlorine or bromine atom.

7. A method according to claim 1, wherein the group R$_1$ is represented by the formula ─(CHY─CH$_2$─O─)$_n$ or ─(CH$_2$)$_m$O─)$_k$ in which Y is a hydrogen atom or a straight or branched alkyl group having 1 to 6 carbon atoms, n is an integer of 1 to 5, m is an integer of 1 to 10, and k is an integer of 1 to 5.

8. A method according to claim 1, wherein when the group R' in the formula,

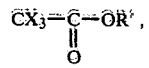

representing said compound (A) is a group having a cyclic ether linkage, R' is a 2,3-epoxy-1-propyl, furfuryl or tetrahydrofurfuryl group.

9. A method according to claim 1, wherein said compound (A) is a member selected from the group consisting of the esters of trichloroacetic acid or tribromoacetic acid with methyl cellosolve, ethyl cellosolve, propyl cellosolve, isopropyl cellosolve, butyl cellosolve, phenyl cellosolve, methylcarbitol, ethylcarbitol, butylcarbitol, propylene glycol monoethyl ether, propylene glycol monobutyl ether, propylene glycol monomethyl ether, 1-butoxy-2-propanol, furfuryl alcohol, tetrahydrofurfuryl alcohol and 2,3-epoxy-1-propanol.

10. A method according to claim 1, wherein said α-olefin is a member selected from the group consisting of propylene, 1-butene, 1-pentene, 1-hexene and 4-methyl-1-pentene.

11. A method according to claim 10, wherein the α-olefin is propylene.

12. A method according to claim 1, wherein the nonconjugated diene monomer is a member selected from the group consisting of 1,4-hexadiene, dicyclopentadiene and 5-ethylidene-2-norbornene.

13. A method according to claim 1, wherein the molar ratio of said organo-aluminum compound to said activating agent is 1:0.005 to 1:0.8 and that of said organo-aluminum compound to said vanadium compound is 1000:1 to 3:1.

14. A method according to claim 13, wherein the molar ratio of organo-aluminum compound is activating agent is 1:0.01 to 1:0.5 and that of organo-aluminum compound to vanadium compound is 5:1 to 100:1.

15. A catalyst system for polymerization of olefins which comprises (1) an organo-aluminum compound, (2) a 3- to 5-valent vanadium compound soluble in an organic inert solvent and (3) (A) a compound of the formula,

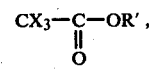

in which R' is a group having a straight or cyclic ether linkage and X is a halogen atom, wherein when R' is a group having a straight ether linkage, it is represented by the formula —R$_1$—R$_2$, in which R$_1$ is an alkylene oxide or polyalkylene oxide group and R$_2$ is a straight or branched alkyl group having 1 to 6 carbon atoms, a phenyl or benzyl group as an activating agent.

16. A catalyst system according to claim 15, wherein the organo-aluminum compound is one represented by the formula, R''$_n$AlX$_{3-n}$ wherein R'' is a hydrocarbon group having 1 to 20 carbon atoms, X is a halogen atom and n is a number satisfying 1≦a≦3.

17. A catalyst system according to claim 16, wherein the organo-aluminum compound is a member selected from the group consisting of diethylaluminum chloride, ethylaluminum dichloride, diisobutylaluminum chloride, isobutylaluminum dichloride, ethylaluminum sesquichloride and isobutylaluminum sesquichloride.

18. A catalyst system according to claim 15, wherein the vanadium compound is a member selected from the group consisting of vanadium halides, vanadium oxyhalides, complexes with oxygen-containing compounds and vanadic acid esters.

19. A catalyst system according to claim 18, wherein the vanadium compound is a member selected from the group consisting of vanadium tetrachloride, vanadium oxytrichloride, vanadium trisacetylacetonate, vanadyl triethoxide, vanadyl ethoxymonochloride, vanadyl ethoxydichloride, vanadyl tributoxide, vanadyl butoxychloride and vanadyl butoxydichloride.

20. A catalyst system according to claim 15, wherein the group X in the formula,

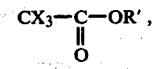

representing said compound (A) is a chlorine or bromine atom.

21. A catalyst system according to claim 15, wherein the group R$_1$ is represented by the formula, $+$CHY—CH$_2$—O$+_n$ or $+$(CH$_2)+_m$O$+_k$ in which Y is a hydrogen atom or a straight or branched alkyl group having 1 to 6 carbon atoms, n is an integer of 1 to 5, m is an integer of 1 to 10, and k is an integer of 1 to 5.

22. A catalyst system according to claim 15, wherein when the group R' in the formula,

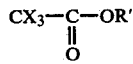

representing said compound (A) is a group having a cyclic ether linkage, R' is a 2,3-epoxy-1-propyl, furfuryl or tetrahydrofurfuryl group.

23. A catalyst system according to claim 15, wherein the compound (A) is a member selected from the group consisting of the esters of trichloroacetic acid or tribromoacetic acid with methyl cellosolve, ethyl cellosolve, propyl cellosolve, isopropyl cellosolve, butyl cellosolve, phenyl cellosolve, methylcarbitol, ethylcarbitol, butylcarbitol, propylene glycol monoethyl ether, propylene glycol monobutyl ether, propylene glycol monomethyl ether, 1-butoxy-2-propanol, furfuryl alcohol, tetrahydrofurfuryl alcohol and 2,3-epoxy-1-propanol.

24. A catalyst system according to claim 15, wherein the molar ratio of said organo-aluminum compound to said activating agent is 1:0.005 to 1:0.8 and that of said organo-aluminum compound to said vanadium compound is 1000:1 to 3:1.

25. A catalyst system according to claim 24, wherein the molar ratio of organo-aluminum compound to activating agent is 1:0.01 to 1:0.5 and that of organo-aluminum compound to vanadium compound is 5:1 to 100:1.

* * * * *